3,573,072
GLASS-CERAMIC ARTICLE AND METHOD
David A. Duke, 7 Theresa Drive, Corning, N.Y. 14830, and Bruce R. Karstetter, R.D. 1, Chatfield Place, Painted Post, N.Y. 14870
No Drawing. Continuation-in-part of application Ser. No. 642,318, May 31, 1967, which is a continuation-in-part of application Ser. No. 365,198, May 5, 1964. This application Mar. 18, 1968, Ser. No. 714,012
Int. Cl. C03c 3/22
U.S. Cl. 106—39        6 Claims

ABSTRACT OF THE DISCLOSURE

This invention relates to the strengthening of glass-ceramic articles wherein the crystal content thereof constitutes the predominant portion and containing nepheline as the principal crystal phase, said nepheline corresponding to the formula $Na_{8-x}K_xAl_8Si_8O_{32}$ wherein $x$ varies from about 0.25 to 4.73. The strengthening is realized through an ion exchange reaction occurring within a surface layer of the glass-ceramic article wherein potassium, rubidium, and/or cesium ions from an external source are exchanged for sodium ions in the nepheline to convert the nepheline in part at least to kalsilite and/or crystals resembling synthetic kaliophylite and cause compressive stresses to be developed in the surface layer.

---

This application is a continuation-in-part of our pending application, Ser. No. 642,318, filed May 31, 1967, which, in turn, was a continuation-in-part of our pending application, Ser. No. 365,198, filed May 5, 1964, both now abandoned.

A glass-ceramic article is produced through the controlled crystallization in situ of a glass article. In general, the production of glass-ceramic articles comprises three primary steps: first, a glass-forming batch is compounded to which a nucleating agent is commonly admixed; second, the batch is melted and the melt cooled and shaped to a glass article of a desired configuration; and, third, the glass article is heat treated according to a particular time-temperature schedule such that nuclei are initially developed in the glass which provide sites for the growth of crystals thereon as the heat treatment is continued.

Since the crystallization is the result of essentially simultaneous growth on the countless developed nuclei, the structure of a glass-ceramic article comprises relatively uniformly-sized, fine-grained crystals homogeneously dispersed in a glassy matrix, the crystals constituting the predominant portion of the article. Glass-ceramic articles are commonly defined as being at least 50% by weight crystalline and, in many instances, are actually over 80% by weight crystalline. Inasmuch as the glass-ceramic articles are highly crystalline, the physical properties thereof are normally materially different from those of the parent glass and are more nearly characteristic of those exhibited by the crystals.

U.S. Pat. No. 2,920,971, the basic patent in the field of glass-ceramics, provides an extensive study of the practical aspects and the theoretical considerations involved in the manufacture of such articles as well as a discussion of the crystallization mechanism and reference is made thereto for further explanation of these factors. As can be appreciated, the crystal phases developed in these articles depends upon the composition of the parent glass and the heat treatment applied thereto. Glass-ceramic articles containing nepheline as the principal crystal phase and a method for producing such articles are disclosed in U.S. Pats. Nos. 3,146,114 and 3,201,266, filed respectively in the name of H. D. Kivlighn on Nov. 23, 1959 and in the name of J. E. MacDowell on July 23, 1962 and assigned to a common assignee. These patents describe the production of such articles which are highly crystalline and reference is made thereto for a more complete discussion of the manufacturing techniques involved.

The diffusion of ions in any medium is a direct function of the structure of the medium itself. Hence, whereas a crystal has a long range ordered structure of ions, glass has only short range order and has even been deemed to consist of a random network if ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, MgO, CaO, BaO, etc.) some of the shared corners (Si—O—Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchange species but also of the structure of the crystalline phase undergoing exchange. When these materials ar suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces an be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitution in the crystal can only sometimes be of help in determining which ion pairs are exchangeable under the rigid conditions imposed by the long range repetitive order of crystals. Thus, for example, sodium ions can replace lithium ion in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

An application entitled "Glass-Cermaic Article and Method" has been filed in the name of R. O. Voss, Ser. No. 365,117, filed May 5, 1964, now abandoned, and assigned to a common assignee. This discloses the general principles of ion exchange within the crystal phase of a glass-ceramic material containing exchangeable ions. This application also specifically discloses that glass-ceramic materials containing a beta-spodumene crystal phase are capable of having the lithium ion of such crystal phase exchanged for a sodium ion within a surface layer on the article, thereby compressively stressing such surface layer and greatly increasing the strength of the article.

Another application, also entitled "Glass-Ceramic Article and Method," has been filed by us in conjunction with S. S. Lewek and R. W. Pfitzenmaier, Ser. No. 365,201, filed May 5, 1964, now abandoned, and assigned to a common assignee. It discloses that a nepheline glass-ceramic article is capable of being strengthened by exchange of potassium for sodium ions in the nepheline crystal phase of a surface layer on the article. However, the ion exchange strengthened articles specifically disclosed in that application are ones in which the alkali metal ions in the crystal phase are essentially all sodium. Further, the application indicates a need for relatively high temperature or long time treatment to attain a tumble abraded strength in the ware.

We have found that the degree of strengthening attainable by large for small ion exchange, as well as the ease of attaining strength by this method, are apparently composition dependent. Specifically, we have found that the presence of a substantial amount of potassium in the parent nepheline crystal renders it more susceptible to this type of strengthening. While we are unable to definitely prove any reason for this unusual composition effect, there is strong evidence that it is related to a slight change in the crystal unit cell as observed in single crystal nepheline studies.

Based on these and other discoveries, the article of our invention is a glass-ceramic article having an original nepheline crystal phase containing potassium and sodium ions, the ratio of the potassium to sodium ions being greater than 1:31 on an ionic basis and the article being characterized by an integral surface layer in which at least a portion of the sodium ions in the original nepheline crystal phase is replaced by a cation of larger ionic radius, including cesium, rubidium, and particularly potassium ions, to provide a surface layer of modified chemical composition having a degree of compressive stress developed therein by the ion replacement, the degree preferably being such that the article has an increased abraded strength. In other words, the final strengthened article has a surface layer of compressive stress overlying an interior portion which is under tensile stress. This reults from the fact that the exchange of sodium ions with potassium, rubidium, and/or cesium ions takes place on a one-for-one basis such that the concentration of the larger ions is greater in the surface layer than in the interior and the concentration of sodium ions is greater in the interior than in the surface layer, these differences in concentration causing the nepheline crystal structure to expand and, in most cases, transform to a crystalline phase with a larger unit cell volume, thereby creating the compressive stress. In accordance with the method embodiment of the invention, a glass-ceramic article having an original nepheline crystal phase containing potassium and sodium ions in a ratio greater than 1:31 on an ionic basis is brought into contact with a source of an exchangeable ion of larger ionic radius, particularly potassium ions, and is maintained in contact with such ion source for a sufficient time to effect an exchange of potassium and sodium ions such that a compressively stressed layer is devolped on the article and the tumble abraded strength of the article is increased.

The term "nepheline" has been employed to designate a natural mineral having a crystal structure classified in the hexagonal crystal system and identified by the chemical formula $(Na, K)AlSiO_4$. However, it has been pointed out by Donnay et al. that the mineral nepheline exists in a wide range of solid solutions, the extent of which is not fully brought out by the above formula (Paper No. 1309 of the Geophysical Laboratory entitled "Nepheline Solid Solutions").

A similar situation exists in the glass-ceramic art. Here again, the term "nepheline" is employed to designate a rather wide range of solid solution crystal phases having characteristics corresponding to those of the mineral. While the crystals may vary considerably in composition, they are essentially sodium or sodium-potassium-aluminum-silicate crystals in the hexagonal system and have a common diffraction peak pattern when studied by X-ray diffraction pattern analysis. It will be understood that, while any nepheline crystal will exhibit a characteristic pattern of diffraction peaks, the spacing and intensity of these peaks may vary somewhat depending on the nature of the crystal phase.

It has been found, however, that as potassium ions are substituted for sodium ions in the nepheline crystal during an ion exchange process, there is a tendency for the nepheline crystal phase to convert, in part at least, to a different type of crystal characterized by a high potassium content and known as kalsilite. This potassium crystal is also in the hexagonal crystal system, and hence similar to the nepheline crystal, but has a somewhat different crystal structure as evidenced by a different pattern of diffraction peaks in an X-ray diffraction pattern analysis. See "The Nepheline-Kalsilite System: (I.) X-ray Data for the Crystalline Phases," J. V. Smith and O. F. Tuttle, American Journal of Science, vol. 255, April 1957, pp. 282–305. When rubidium and/or cesium ions are substituted for sodium ions in the nepheline crystal during the ion exchange process, a phase transformation occurs yielding an unidentifiable crystal phase resembling synthetic kaliophylite. The $d$ spacings observed in an X-ray diffraction analysis are slightly larger which is consistent with the larger sizes of these ions.

Accordingly, the presence of nepheline and kalsilite and/or the crystals resembling synthetic kaliophylite can easily be observed by X-ray diffraction analysis, and a qualitative estimate may be made of their relative proportions under some circumstances. While we have been unable to determine any definite relationships, there is evidence of a correlation between the development of the kalsilite and/or the synthetic kiliophylite-type crystal during ion exchange and the nature of the strengthening that occurs in the article as a result of the ion exchange.

The terminology "original nepheline crystal phase" is employed to signify the crystal phase that originally separates, or is caused to separate, during the thermal conversion of glass to glass-ceramic and which may be identified by X-ray diffraction analysis. This does not mean that crystal phases other than nepheline must be excluded. However, for strengthening purposes, it is generally desirable to avoid substantial amounts of another crystal phase which will dilute the amount of nepheline crystal phase available for ion exchange strengthening. It is recognized, however, that the presence of a second phase may occur either as an impurity or as a necessary measure to modify such characteristics as thermal coefficients of expansion, and such mixed crystal phases are contemplated within the scope of the present invention.

Of particular interest in connection with the present purpose of glass-ceramic strengthening is a family or system of nepheline solid solution crystal phases corresponding generally in chemical composition to the formula $(Na_{8-x}K_xAl_8Si_8O_{32})$ wherein $x$ may vary from 0 to about 4.73. It has been observed that, in glass-ceramics of the nepheline type, the various ions, and particularly the alkali metal cations, tend to appear in the crystal phase in essentially the same proportion as they appear in the parent glass composition. Also, with a greater proportion of potassium ion present than that indicated, a different type of crystal, specifically kaliophylite, tends to form as the original crystal phase in the glass-ceramic.

In this system or family of glass-ceramics, the crystal phase may be considered in a manner analogous to that employed by Donnay et al. with respect to the mineral nepheline. Thus, with reference to the formula $$Na_{8-x}K_xAl_8Si_8O_{32}$$

the nepheline crystal may be considered as existing in these forms:

subpotassic wherein $x$ equals 0.0 to 0.25,
mediopotassic wherein $x$ equals 0.25 to 2.0, and
perpotassic wherein $x$ equals 2.0 to 4.73.

While we are unable, as yet, to positively identify these different crystal forms in glass-ceramic materials, we find changes in ion exchange strengthening characteristics which correspond approximately. Therefore, we find it convenient to use the terminology to differentiate our materials compositionwise.

As indicated earlier, we have found that, where sufficient $K_2O$ is present to permit development of a nepheline crystal phase corresponding in composition to a medio- or perpotassic form, the glass-ceramic normally is strengthened more readily or easily than the nepheline glass-ceramics with lower potassium contents. Thus, nepheline glass-ceramics having a composition corresponding to the subpotassic crystal form require ion exchange at a relatively higher temperature or for a longer time to provide increased abraded strength. Furthermore, the maximum strength attainable in the lower potassium content materials under optimum treating conditions is markedly lower than that attainable in the higher potassium materials. The perpotassic composition region appears to offer the maximum in strengthening capabilities.

Nepheline has a structure based on a tridymite-type framework in which about half of the silicon atoms are replaced by aluminum and electrical neutrality is maintained by the presence of alkali atoms within the structure. In nepheline of the mediopotassic range, the tridymite-type framework is distorted and the alkali sites are of two different sizes. Two of the sites have a cation-oxygen distance of about 2.9 A. whereas the other six are about 2.65 A. In perpotassic nephelines, the framework is further distorted to provide eight framework sites with cation-oxygen distances of 2.9 A. Potassium ions, being larger than sodium ions, occupy, when possible, the larger cation sites. These larger sites appear to facilitate the exchange of potassium ions for sodium ions within the nepheline lattice and permit the exchange of rubidium and cesium ions for sodium ions.

In this invention, the preferred structure of the original nepheline crystallites in the glass-ceramic is one containing enough potassium to form a medio- or perpotassic nepheline. Such a structure facilitates the exchange reaction allowing a greater development of kalsilite and/or crystals resembling synthetic kaliophylite at the surface and, hence, a greater degree of strengthening.

Practice of our invention then depends on the composition and nature of the nepheline crystal phase developed originally. This is determined by providing sufficient potassium ions in the parent glass composition so that a desired form of nepheline crystal develops during the ceramming process. The ratio of potassium to sodium on an ionic basis should be at least 1:31 (0.25:1.75), and preferably over 1:4, in accordance with the above ionic formulation. In that case, an increase in abraded strength can be attained, utilizing a potassium-for-sodium ion exchange, at temperatures in the range of 400°–600° C. within 24 hours, although higher temperatures may be employed to speed up the rate of exchange and also increase the amount of strengthening attainable in a given time.

For relatively low temperature ion exchange at temperatures of 400°–600° C., it is generally convenient to employ a molten potassium nitrate salt bath. While the nitrate bath may be used at temperatures up to about 600° C. or so, the salt tends to decompose at such higher temperatures and severely attack the article surface as well as containers and other equipment. For higher temperature work then, it is convenient to employ a molten salt bath composed of potassium chloride and potassium sulfate and based on a eutectic mixture of these salts. This is a mixture of about 52% KCl and 48% $K_2SO_4$ which melts at about 690° C.

Where rubidium and/or cesium ions are exchanged with the sodium ions of the nepheline, somewhat higher exchange temperatures are required, viz., 750°–950° C., to attain the desired high strengths. This is believed to be due to the large size of the ions. Molten salt baths of 50% by weight RbCl and 50% by weight $Rb_2SO_4$ and 75% by weight RbCl and 25% by weight $Rb_2SO_4$ were utilized in the exchange of rubidium ions for sodium ions, whereas a molten salt bath of 75% by weight CsCl and 25% by weight Cs$_2$SO$_4$ was employed in the exchange of cesium ions.

As indicated, the manner in which abraded strength may be increased in accordance with our invention is composition dependent. With this reservation, however, our invention is not otherwise limited to the manner in which the glass-ceramic material is formed and is generally applicable to the strengthening of any glass-ceramic material wherein the predominant crystal phase is a nepheline-type crystal and the requisite ratio of potassium to sodium ions exist. For strengthening purposes, however, we prefer to employ titania-nucleated compositions which, in percent by weight, consist essentially of about 25–50% SiO$_2$, 25–50% Al$_2$O$_3$, 5–20% Na$_2$O, 1–15% K$_2$O, and 5–15% TiO$_2$.

The method aspects of the present invention, as well as the articles produced thereby, will be further illustratively described with reference to specific but not limiting embodiments thereof.

A series of glasses was formulated that was capable of providing glass-ceramics spanning the three "potassic" crystal forms mentioned above. In these glasses, the oxide of potassium was progressively substituted in increasing amounts for the oxides of sodium and silicon in a selected base glass. The glass compositions, as calculated in parts by weight on an oxide basis from the batch, are set forth in the following table. The table also shows the "$x$" value for potassium ion in the nepheline crystal phase developed when the glass is converted to a glass-ceramic.

TABLE

| | In parts by weight | | | | | | | | |
|---|---|---|---|---|---|---|---|---|---|
| | G | H | I | J | L | N | O | U | W |
| SiO$_2$ | 47.9 | 47.7 | 47.5 | 47.3 | 46.7 | 46.1 | 45.6 | 45.1 | 44.6 |
| Al$_2$O$_3$ | 34.0 | 34.0 | 34.0 | 34.0 | 34.0 | 34.0 | 34.0 | 34.0 | 34.0 |
| Na$_2$O | 18.1 | 17.9 | 17.6 | 17.0 | 15.9 | 14.7 | 13.6 | 12.7 | 11.8 |
| K$_2$O | 0.0 | 0.4 | 0.9 | 1.7 | 3.4 | 5.2 | 6.8 | 8.2 | 9.6 |
| TiO$_2$ | 8.0 | 8.0 | 8.0 | 8.0 | 8.0 | 8.0 | 8.0 | 8.0 | 8.0 |
| As$_2$O$_3$ | 0.8 | 0.8 | 0.8 | 0.8 | 0.8 | 0.8 | 0.8 | 0.8 | 0.8 |
| $x$ (moles) | 0.0 | 0.1 | 0.25 | 0.5 | 1.0 | 1.5 | 2.0 | 2.4 | 2.8 |

A quantity of each glass was melted to a substantially homogeneous state and drawn into quarter inch cane particularly adapted to use in strength evaluation. The cane was converted to the glass-ceramic state by the following thermal treatment:

CERAMMING CYCLE

Heat to 850° C. at 300° C./hour,
Hold at 850° C. for four (4) hours,
Heat to 1100° C. at 300 C./hour,
Hold at 1100° C. for four (4) hours,
Cool in furnace.

The structure of the crystallized cane of each example was examined utilizing transmission and replica electron micrographs. Each cane sample was determined to be greater than about 70% by weight crystalline with X-ray diffraction analysis indicating that nepheline and a very minor amount of anatase (TiO$_2$) comprised the crystal phase present. The anatase was estimated to constitute no more than about 5% of the total crystalline material.

It can be appreciated that since the glass-ceramic articles of this invention are highly crystalline, not only is the amount of residual glassy matrix small but the composition thereof will be very different from that of the parent glass. Hence, in the preferred embodiment of the invention, substantially all of the alkali metal ions will be included in the crystal structure of the nepheline and any other crystal phase present leaving a residual glassy matrix consisting essentially of silica. Some alkali metal ion in excess of that making up the crystal phase or phases can be tolerated but amounts approaching 5% by weight in excess frequently result in a coarsely-crystalline product rather than the desired fine-grained article. Therefore, although in the preferred embodiment of the invention alkali metal ions are completely absent from the residual glassy phase, a very minor amount can be present therein. It will be apparent that these "contaminant" ions in the the glassy matrix can also be exchanged with the potassium ions during the subsequent ion exchange process, but, it is equally evident that inasmuch as the quantity of such ions is very small and the total glassy content of the article is very small, the effect of such an exchange upon the properties of the article would be essentially negligible when compared to the exchange occurring in the nepheline crystals.

After the crystallization treatment two sets of four inch long cane samples were selected for each composition, and one set of each was treated in accordance with each of the following ion exchange treatments:

(1) Immerse for eight (8) hours in a bath of molten potassium nitrate (KNO$_3$) at a temperature of 590° C.

(2) Immerse for eight (8) hours in a molten bath composed of 52% KCl–48% K$_2$SO$_4$, and held at 730° C.

Following such treatment each cane sample was cleaned and subjected to a severe form of surface abrasion wherein five cane samples were mixed with 200 cc. of 30 grit silicon carbide particles and subjected to a tumbling motion for 15 minutes in a Number 0 ballmill jar rotating at 90–100 r.p.m. Each abraded cane sample was then mounted on spaced knife edges in a Tinius Olsen testing machine and a continuously increasing load applied opposite to and intermediate of the supports until the cane broke in flexure. Inasmuch as, first, the strength of these articles is directly founded upon the surface compression layer developed thereon via the ion exchange and, second, essentially all service applications for these articles will involve some surface injury even if only that experienced in normal handling and shipping, the practical or permanent strength exhibited by these articles is that which remains after substantial surface abrasion. Therefore, the above-described tumble abrasion test is one which was first developed in the glass industry to simulate surface abuse which a glass article experiences in field service and is believed to be equally appropriate with glass-ceramic articles. Preferably, the depth of the introduced compression layer is at least 0.001" to assure reasonably good abraded strength in the articles. This depth of layer is quite apparent through electron microscope examination of a cross-section of the article.

From the measured load required to break each cane a modulus of rupture (MOR) value was calculated for the individual cane and an average value determined for each set of five samples. These average values are set out in the following table:

TABLE

| Sample | Bath | Average MOR (p.s.i.) |
|---|---|---|
| G | 1 | 12,600 |
| G | 2 | 73,600 |
| H | 1 | 11,800 |
| H | 2 | 97,700 |
| I | 1 | 16,400 |
| I | 2 | 65,800 |
| J | 1 | 58,300 |
| J | 2 | 162,400 |
| L | 1 | 87,200 |
| L | 2 | 203,100 |
| N | 1 | 94,900 |
| N | 2 | 195,800 |
| O | 1 | 102,800 |
| O | 2 | 185,800 |
| U | 1 | 124,000 |
| U | 2 | 168,600 |
| W | 1 | 125,000 |
| W | 2 | 197,700 |

The effectiveness of increasing the potassium content in the crystal is seen by comparing compositions G, H, and I with the remaining compositions. Also, the effectiveness of higher temperature treatment in attaining strength increase within a given time may be seen.

To demonstrate the great improvement in mechanical strength which can be obtained in the glass-ceramic article of this invention utilizing the exchange of rubidium or cesium with the sodium and, perhaps, to some extent the potassium ions of the nepheline, cane samples of about ¼" diameter of Example U and of glass P having the following composition, in parts by weight, of 39.8 $SiO_2$, 38.0 $Al_2O_3$, 11.7 $Na_2O$, 7.5 $K_2O$, 1.0 $As_2O_3$, and 2.0 $ZrO_2$ were crystallized and ion exchanged in the following manner.

Example U was crystallized thusly:

Heat to 800° C. at 300° C./hour
Hold at 800° C. for 1 hour
Heat to 850° C. at 300° C./hour
Hold at 850° C. for 4 hours
Heat to 1100° C. at 300° C./hour
Hold at 1100° C. for 4 hours
Cool in furnace Glass P was crystallized as follows:

Heat to 870° C. at 300° C./hour
Hold at 870° C. for 5 hours
Heat to 1100° C. at 300° C./hour
Hold at 1100° C. for 4 hours
Cool in furnace Electron micrographs of the crystallized cane samples indicated crystallinity of over 70% by weight wherein X-ray diffraction analysis determined that Example U contained nepheline with less than about 5% by weight anatase and Example P contained nepheline with only a trace of cubic $ZrO_2$.

Four inch long segments of the crystallized cane were then treated in accordance with the ion exchange treatments set out in the table below and modulus of rupture measurements made after the canes had been subjected to the tumbling abrasion technique described above.

TABLE

| Sample | Salt bath | Ion exchange treatment, hours | Average MOR p.s.i. |
|---|---|---|---|
| U | 50% $RbCl$–50% $Rb_2SO_4$ | 4–750°C. | 100,000 |
| U | Same as above | 8–750°C. | 107,000 |
| U | ----do---- | 16–750°C. | 115,000 |
| U | ----do---- | 4–850°C. | 114,000 |
| U | ----do---- | 8–850°C. | 157,000 |
| U | ----do---- | 16–850°C. | 170,000 |
| U | 75% $RbCl$–25% $Rb_2SO_4$ | 8–750°C. | 126,000 |
| U | Same as above | 8–825°C. | 139,000 |
| U | 75% $CsCl$–25% $Cs_2SO_4$ | 4–750°C. | 36,000 |
| U | Same as above | 8–750°C. | 90,000 |
| U | ----do---- | 16–750°C. | 167,000 |
| U | ----do---- | 8–825°C. | 150,000 |
| U | ----do---- | 4–850°C. | 135,000 |
| U | ----do---- | 8–850°C. | 147,000 |
| U | ----do---- | 24–850°C. | 201,000 |
| P | 75% $RbCl$–25% $Rb_2SO_4$ | 8–755°C. | 67,000 |
| P | Same as above | 8–830°C. | 160,000 |
| P | ----do---- | 8–878°C. | 178,000 |
| P | 75% $CsCl$–25% $Cs_2SO_4$ | 8–755°C. | 11,000 |
| P | Same as above | 8–830°C. | 131,000 |
| P | ----do---- | 8–878°C. | 173,000 |

This table amply demonstrates the tremendous mechanical strengths which can be attained utilizing the exchange of rubidium or cesium for the sodium in the nepheline crystals and, further, that somewhat higher exchange temperatures must be used to assure the development of such strengths than in the potassium-for-sodium exchange.

Although in the recited examples, a bath of molten salt was employed as the source of potassium, rubidium, or cesium ions and such is the preferred mode for carrying out the ion exchange process, it will be understood that other sources of potassium ions can be utilized which are useful at the temperatures under discussion, such as pastes and vapors as are well-known in the staining arts. Likewise, it will be apparent that the most rapid rate of exchange and the highest strengths will be effected where pure potassium, rubidium, or cesium ion-containing materials are utilized as the exchange medium although some contamination is tolerable. However, the determination of the maximum tolerable amount of contamination is well within the ingenuity of one of ordinary skill in the art.

As has been explained above, this invention is founded upon the exchange of potassium, rubidium, and/or cesium ions for sodium ions in nepheline. That such an exchange does occur is fully borne out through X-ray diffraction analysis of the surface crystals before and after the ion exchange. Thus, the nepheline is converted to kalsilite or crystals which are as yet unidentified but resemble synthetic kaliophylite. This conversion of nepheline is demonstrated through an examination of the following table which records several of the $d$-spacings and the intensities thereat observed in an X-ray diffraction pattern made of the surface of Example U to and after the ion exchange reaction. The intensities are arbitrarily reported as very strong (v.s.), strong (s.), moderate (m.), and weak (w.).

TABLE

| Before exchange | | Potassium exchange [1] | | Cesium exchange [2] | |
|---|---|---|---|---|---|
| d | I | d | I | d | I |
| 4.37 | w. | 4.35 | w. | 4.70 | w. |
| 4.25 | m. | | | | |
| 3.90 | s. | 3.98 | s. | | |
| 3.54 | w.[3] | 3.52 | w.[3] | | |
| 3.31 | m. | | | | |
| 3.04 | v.s. | 3.14 | v.s. | 3.24 | v.s. |
| 2.92 | m. | | | 2.94 | w. |
| 2.61 | w. | 2.61 | s. | 2.70 | s. |
| 2.53 | w. | 2.51 | w. | | |
| 2.37 | m. | 2.44 | w. | | |
| 2.33 | w. | 2.23 | w. | 2.33 | m. |
| 2.10 | w. | 2.18 | m. | 2.25 | w. |
| 1.94 | w. | | | 2.09 | w. |
| 1.89 | w.[3] | 1.89 | w.[3] | | |

[1] 52% $KCl$–48% $K_2SO_4$ 8 hours at 730° C.
[2] 75% $CsCl$–25% $Cs_2SO_4$ 24 hours at 850° C.
[3] Anatase.

Thus, this table clearly illustrates the change in crystal structure which the nepheline in the glass-ceramic articles undergoes during the ion exchange reaction as is evidenced by the shift of the $d$-spacings and the change of intensities. Hence, the X-ray diffraction pattern taken of the surface crystals after ion exchange with potassium ions closely approximates that exhibited by kalsilite, while the cesium ion exchange changes the character of the crystals in still another manner and yields an X-ray diffraction pattern unlike any known in the literature but resembling that exhibited by synthetic kaliophylite.

Finally, since the sodium ions are essentially absent from the residual glassy matrix, the ion exchange leading to the surface compression layer in the glass-ceramic articles must necessarily occur within the crystals. As has been observed above, while nepheline is the principal crystal phase within the glass-ceramic articles, minor amounts of other crystals can be present. Inasmuch as their presence can dilute the maximum strengthening effect which is attainable where nepheline is the sole crystal, it is preferred to keep the sum of all such extraneous crystallization less than about 20% of the total crystallization.

We claim:

1. A unitary glass-ceramic article of high strength wherein the crystal content thereof constitutes at least 70% by weight of the article and having an integral surface compressive stress layer consisting essentially of kalsilite and/or crystals resembling synthetic kaliophylite as the crystal phase derived from nepheline crystals originally present in said surface and an interior portion consisting essentially of $Na_2O$, $K_2O$, $Al_2O_3$, and $SiO_2$ wherein the crystal phase therein consists essentially of nepheline corresponding to the formula $$Na_{8-x}K_xAl_8Si_8O_{32}$$

$x$ varying from about 0.25–4.73.

2. A unitary glass-ceramic article in accordance with claim 1 wherein said interior portion consists essentially, by weight on the oxide basis, of about 25–50% $SiO_2$, 25–50% $Al_2O_3$, 5–20% $Na_2O$, 1–15% $K_2O$, and 5–15% $TiO_2$.

3. A method for producing a unitary glass-ceramic article of high strength wherein the crystal content thereof constitutes at least 70% by weight of the article and having an integral surface compressive stress layer and an interior portion which comprises contacting a glass-ceramic article consisting essentially of $Na_2O$, $K_2O$, $Al_2O_3$, and $SiO_2$ wherein the crystal phase therein consists essentially of nepheline corresponding to the formula $Na_{8-x}K_xAl_8Si_8O_{32}$, $x$ varying from about 0.25–4.73, at a temperature between about 400°–950° C. with a source of exchangeable potassium, rubidium, and/or cesium ions for a period of time sufficient to replace at least part of the sodium ions of said nepheline in a surface layer of the article with potassium, rubidium, and/or cesium ions to convert said nepheline to kalsilite and/or crystals resembling synthetic kaliophylite, thereby affecting an integral compressively stressed surface layer on the article.

4. A method in accordance with claim 3 wherein said glass-ceramic article consists essentially, by weight on the oxide basis, of about 25–50% $SiO_2$, 25–50% $Al_2O_3$, 5–20% $Na_2O$, 1–15% $K_2O$, and 5–15% $TiO_2$.

5. A method in accordance with claim 3 wherein said glass-ceramic article is contacted with a source of exchangeable potassium ions at a temperature between about 400°–600° C. for a period of time not exceeding about 24 hours.

6. A method in accordance with claim 3 wherein said glass-ceramic article is contacted with a source of exchangeable potassium ions at a temperature between about 700°–800° C. for a period of time not exceeding about 16 hours.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,282,770 | 11/1966 | Stookey et al. | 65—30X |
| 3,482,513 | 2/1969 | Denman | 65—33X |

OTHER REFERENCES

Kistler, S. S., "Stresses in Glass Produced by Nonuniform Exchange of Monovalent Ions," J. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—30, 33